US008675478B2

(12) United States Patent
Asati et al.

(10) Patent No.: US 8,675,478 B2
(45) Date of Patent: Mar. 18, 2014

(54) NETWORK BASED SWITCHOVER TO ORIGINAL CONTENT AFTER AD-INSERTION DEVICE FAILURE

(75) Inventors: Rajiv Asati, Morrisville, NC (US); Gregory Shepherd, Eugene, OR (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 12/112,641

(22) Filed: Apr. 30, 2008

(65) Prior Publication Data

US 2009/0274042 A1 Nov. 5, 2009

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .............................. 370/225; 370/390; 370/432

(58) Field of Classification Search
None
See application file for complete search history.

(56) References Cited

U.S. PATENT DOCUMENTS

| | | | |
|---|---|---|---|
| 6,314,105 B1 | 11/2001 | Luong | |
| 6,330,238 B1 | 12/2001 | Ooe | |
| 6,331,983 B1 | 12/2001 | Haggerty et al. | |
| 6,337,862 B1 | 1/2002 | O'Callaghan et al. | |
| 6,791,981 B1 | 9/2004 | Novaes | |
| 6,839,865 B2 | 1/2005 | Gould | |
| 8,028,092 B2 * | 9/2011 | Brown et al. | 709/246 |
| 2002/0150094 A1 | 10/2002 | Cheng | |
| 2006/0107302 A1 * | 5/2006 | Zdepski | 725/135 |
| 2006/0221866 A1 | 10/2006 | Shepherd | |
| 2007/0058627 A1 | 3/2007 | Smith et al. | |
| 2007/0233857 A1 * | 10/2007 | Cheng et al. | 709/224 |
| 2007/0243821 A1 | 10/2007 | Hundscheidt et al. | |

(Continued)

FOREIGN PATENT DOCUMENTS

| | | |
|---|---|---|
| CN | 102077509 A | 5/2011 |
| EP | 2289203 | 11/2009 |
| FR | 2895629 A1 | 6/2007 |
| WO | WO 2009/134935 | 11/2009 |

OTHER PUBLICATIONS

B. Cain, et al. Internet Group Management Protocol, Version 3 Request for Comments: 3376, Aquired at: http://www.rfc-editor.org/rfc/rfc3376.txt, 50 pages, Oct. 2002.

(Continued)

*Primary Examiner* — Chirag Shah
*Assistant Examiner* — Suk Jin Kang
(74) *Attorney, Agent, or Firm* — Patent Capital Group

(57) ABSTRACT

In one embodiment, a network device joins a first multicast tree to receive post-ad-inserted video content. The network device also joins a second multicast tree to receive the pre-ad-inserted video content. The content from the first multicast tree is forwarded by the network device to the receiver(s). The network device determines if it does not receive the content on the first multicast tree due to any failure, in which case, it delivers the content from the second multicast tree to the receiver(s). This enables the receiver to receive the original (pre-ad-inserted) content during the failure in first multicast tree. When the failure is resolved, the network device can go back to sending the content from the first multicast tree to the receiver(s).

18 Claims, 4 Drawing Sheets

(56) References Cited

U.S. PATENT DOCUMENTS

| | | | |
|---|---|---|---|
| 2007/0268899 A1* | 11/2007 | Cankaya | 370/390 |
| 2007/0283038 A1 | 12/2007 | Asati et al. | |
| 2008/0201752 A1* | 8/2008 | Liu et al. | 725/114 |
| 2008/0285435 A1* | 11/2008 | Abdulla et al. | 370/217 |
| 2009/0094639 A1* | 4/2009 | Haberman et al. | 725/34 |
| 2009/0106792 A1* | 4/2009 | Kan et al. | 725/34 |
| 2009/0187941 A1* | 7/2009 | Smith | 725/35 |
| 2009/0217318 A1* | 8/2009 | Versteeg et al. | 725/32 |
| 2009/0245248 A1* | 10/2009 | Arberg et al. | 370/390 |
| 2010/0107001 A1* | 4/2010 | Asati et al. | 714/4 |

OTHER PUBLICATIONS

H. Holbrook "Source-Specific Multicast for IP"; Arastra, Inc.; Aug. 2006; 19 pages.

PCT International Search Report mailed Jul. 14, 2009 for PCT/US2009/042178, 4 pages.

PCT International Preliminary Report on Patentability and Written Opinion of the International Searching Authority mailed Nov. 11, 2010 for PCT/US2009/042178, 12 pages.

USPTO Jul. 8, 2011 Notice of Allowance from U.S. Appl. No. 11/095,736.

Cisco Systems, Inc., "Anycast RP: Multicast Source Discovery Protocol Overview," Jun. 2001, 6 pages; http://www.cisco.com/en/US/docs/ios/solutions_docs/ip_multicast/White_papers/anycast.html.

EPO Apr. 27, 2012 Response to Dec. 30, 2011 EPO Communication European Patent Application EP09739737.6; 10 pages.

EPO Dec. 30, 2011 EP Communication from European Patent Application EP 09739736; 8 pages.

EPO Oct. 8, 2012 Communication from European Patent Application EP 09739737; 10 pages.

EPO Apr. 12, 2013 Response to Communication dated Oct. 8, 2012 from European Patent Application EP 09739737; 9 pages.

PRC Feb. 1, 2013 SIPO First Office Action from Chinese Application No. 200980125144; 54 pages.

EPO Oct. 15, 2013 Communication from European Patent Application EP 09739737; 9 pages.

Fenner, et al., Protocol Independent Multicast—Sparse Mode (PIM-SM): Protocol Specification (Revised); Network Working Group RFC4601; XP015047366, ISSN: 0000-0003; 151 pages.

PRC Oct. 21, 2013 SIPO Second Office Action from Chinese Application No. 200980125144; 11 pages.

* cited by examiner

NETWORK BASED SWITCHOVER TO ORIGINAL CONTENT AFTER AD-INSERTION DEVICE FAILURE

FIELD OF THE INVENTION

Particular embodiments generally relate to networking.

BACKGROUND

Ad insertion is common in video networks. An ad insertion device typically ingests content from a source in a network, inserts the ad, and then transmits the ad-inserted video content to the network. The content is then delivered to receivers. Because all content is ingested by the ad insertion complex and retransmitted, failures at the ad insertion complex cause the receivers to not receive the ad inserted content. This happens even though the original content is still being sent from the source and received by the routers in the network.

DETAILED DESCRIPTION OF EMBODIMENTS

Overview

Particular embodiments generally relate to delivering multicast content from source to receiver(s) on a multicast tree in an IP/MPLS network.

In one embodiment, a network device joins a first multicast tree for content that includes advertisements inserted in the content. The network device also joins a second multicast tree for the content that does not include the advertisement. The network device also installs two corresponding entries, for both multicast trees, in its routing & forwarding database to correctly handle the content received on both multicast trees. The first multicast tree includes at least one outgoing interface at the network device to allow the content to be sent to at least one receiver. The second multicast tree includes a non-active interface or dummy interface at the network device such that the content, when received, is not sent to any receiver. The network device determines if it does not receive the content on the first multicast tree due to any failure, in which case, it delivers the content from the second multicast tree to the receiver by swapping the list of outgoing interfaces associated with the first multicast tree with that of the second multicast tree. This enables the receiver to receive the original content during the failure in first multicast tree. When the failure is resolved, the network device can go back to sending the content from the first multicast tree to the receiver.

Example Embodiments

Figure 1:
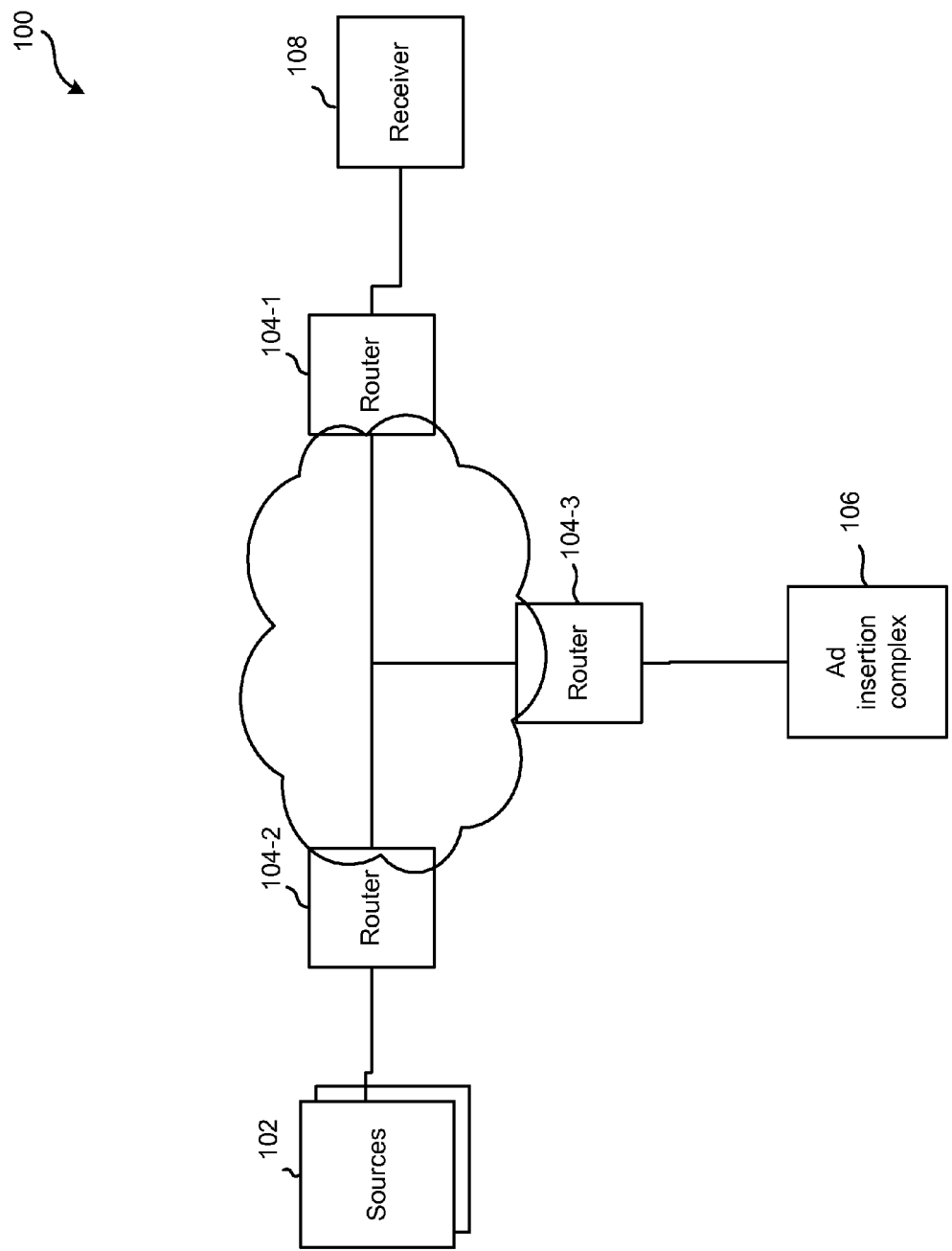
FIG. 1 depicts an example of a system for delivering content according to one embodiment.

FIG. 1 depicts an example of a system 100 for delivering multicast content according to one embodiment. It will be understood that other components of system 100 will be appreciated by a person skilled in the art. System 100 includes a source 102, routers 104, an ad insertion complex (AIC) 106, and a receiver 108. It will be understood that any number of the shown components may be provided. For example, only one router 104 may be provided or additional routers may be provided. Also, in network 100, multiple sources 102, receivers 108, and ad insertion complexes 106 may be provided, but are not shown for discussion purposes.

Network 100 may be an Internet protocol (IP) or multiprotocol label switching (MPLS) network. Sources 102 may be found in one or more network devices that deliver content. There may be multiple sources that can deliver content. These sources may be found at the head end of a service provider's network.

Receivers 108 may be a device that receives the content. For example, receiver 108 may be a set-top box that can receive the content and display it on a display device. Other receivers 108 may also be appreciated, such as personal computers, cellular phones, etc.

Routers 104 may be network devices that are configured to route or forward the multicast content using either IP forwarding or MPLS forwarding. Particular embodiments explain the invention using the IP forwarding paradigm but a person skilled in the art will recognize that MPLS could be used. A multicast tree is analogically defined to include a source as the root and receivers as leaves. Multicast distribution trees are formed such that data packets from the root to a multicast group reach all receivers which have "joined" the group. The multicast tree may be established as IP multicast tree or MPLS multicast tree etc. in an IP/MPLS network. In the former case, each multicast tree is identified by a pair of IP addresses e.g. (S,G) on a network device, whereas in the latter case, each multicast tree is identified by an MPLS label on a network device.

Routers 104 may include different routing devices. For example, routers 104 may include wireless routing devices, wired routing devices, etc.

Ad insertion complex 106 is configured to receive the content from source 102 through the IP/MPLS network 100, insert information into the content, and send the modified content back to the IP/MPLS network 100 for delivering it to the receivers 108. In one embodiment, ad insertion complex 106 inserts an advertisement into the content or overlays an advertisement on the existing content. An advertisement may be any information such as commercials, logos etc. inserted or overlaid into the original content. A company may pay for an advertisement spot in which their product or service appears in the content. Although advertisements are described, it will be understood that any content may be inserted.

Particular embodiments provide multiple multicast trees for pre-ad inserted content and post-ad inserted content. Each multicast tree uniquely corresponds to a route through the network and is identified by a network device using a pair of IP addresses that include a unicast IP address and a multicast (Group) IP address. The unicast IP address may further identify either a specific source (as in (S,G) for a specific multicast tree) or any source (as in (*,G) for a shared multicast tree). The pre-ad inserted content is the original content without any advertisements inserted into it by ad insertion complex 106. The post-ad inserted content is the content that includes the advertisements inserted into the original content by ad insertion complex 106. The post-ad inserted content originates from ad insertion complex 106, whereas the pre-ad inserted content originates from the source 102. Ad-insertion complex 106 is considered as another source from the network 100 perspective. The multicast tree (e.g. S,G pair) for the multicast tree of pre-ad inserted content is different from that of the multicast tree of post-ad inserted content.

Router 104 joins both multicast trees to receive pre and post-ad-inserted content from network 100, however, it sends only the post-ad-inserted content to receivers 108. When a failure is detected for the post-ad inserted content, router 104 may switch to sending the pre-ad inserted content to receivers 108 by modifying the outgoing interface list of related multicast trees. Thus, receiver 108 does not experience outages in receiving the content. When the failure is resolved, router 104 may switch back to the post-ad inserted content.

Figure 2:
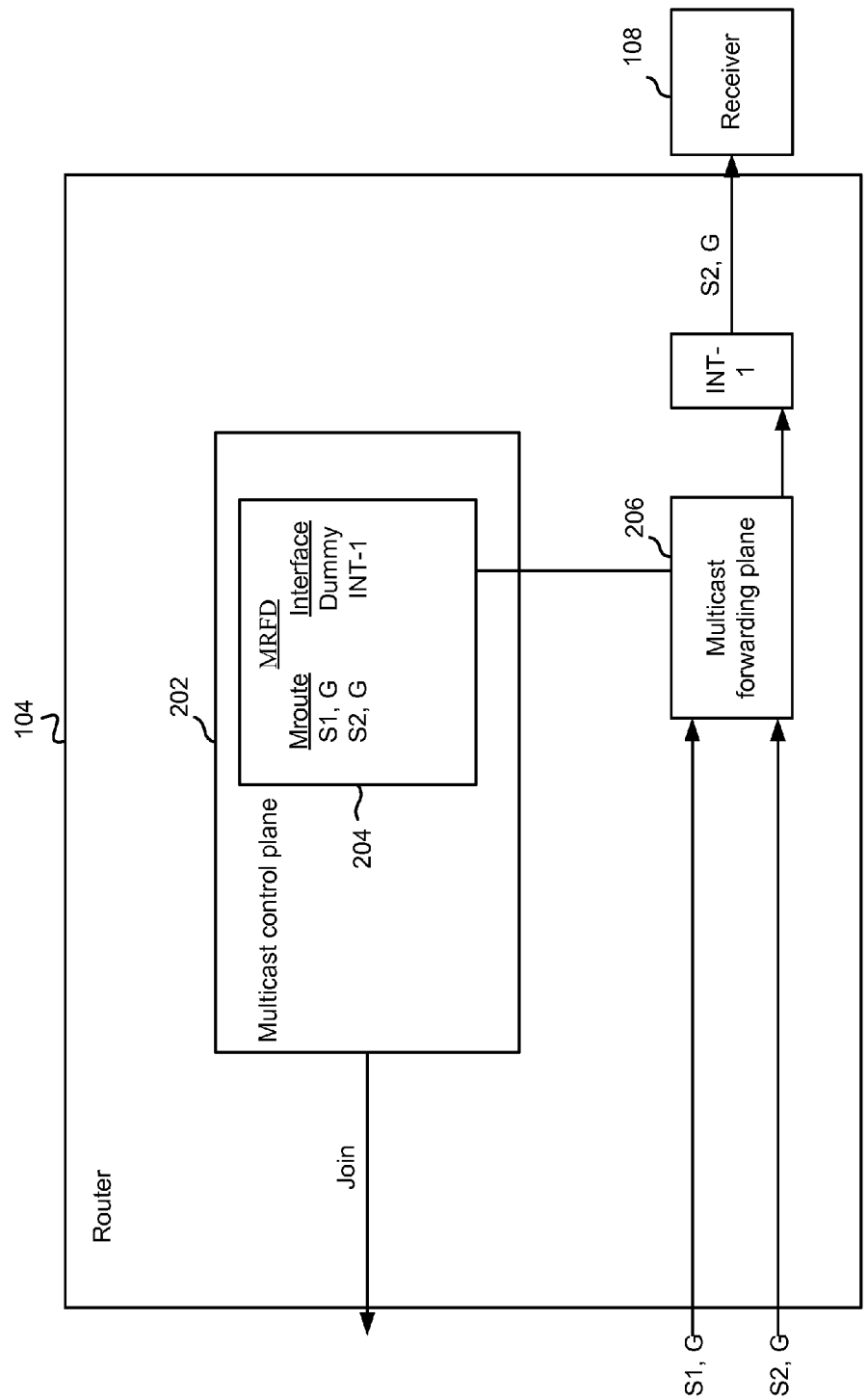
FIG. 2 depicts a more detailed example of a router according to one embodiment.

The process of initializing the multicast routes and performing the switchover will now be described in more detail. FIG. 2 depicts a more detailed example of a router 104 according to one embodiment. A multicast control plane 202 is provided in one or more routers 104. In one example, multicast control plane 202 is found in the last hop router (LHR) which is the last router to connect to receiver 108. In this case, the last hop router is router 104-1. It will be understood that multicast control plane 202 may also be found in other network devices, such as router 104-3, etc.

In one embodiment, multicast control plane 202 may receive an Internet Group Management Protocol (IGMP) join request from receiver 108 to receive content. In another embodiment, multicast control plane 202 may not receive any IGMP join from the receiver, but may be statically configured to provide the content to the receiver. Multicast control plane 202 may then trigger the joining of appropriate multicast trees using Protocol Independent Multicast (PIM) join messages.

Multicast control plane 202 subscribes to receive content from 'ad insertion complex' 106 as well as source 102 for specific multicast groups, triggered by the received request from the receiver 108. The multicast group may be the same. In one example, G is the multicast group address, S1 is the unicast IP address of the source 102, and S2 is the unicast IP address of the ad insertion complex 106. This means that the multicast tree (S1, G) represents the multicast tree for pre-ad-inserted content, whereas the multicast tree (S2, G) represents the multicast tree for post-ad inserted content. Multicast control plane 202 sends Protocol Independent Multicast (PIM) join message for (S1,G) and (S2,G) towards the sources to subscribe to receive the content. Different combinations or identifiers may be used to indicate the multicast routes for the multicast trees. For example, the group may be generic or may be specified by G1—where the multicast tree is (S1, G1) and G2—where the multicast tree is (S1, G2).

In different versions of Internet Group Management Protocol (IGMP), a join message is different. In version v2, a source of (S, G) is not specified in the IGMP join message. In one embodiment, receiver 108 sends the join request of (*,G), which requests content for the group "G" from any source. In version v3, receiver 108 specifies the source of (S,G) in the IGMP join message. The IGMP join for (S,G) requests content for the group "G" only from the source "S". In v3, if the receiver asks for content from source S2, but gets the content from source S1, then receiver 108 may drop the content from S1. IGMP version v3 also allows for specifying more than one sources in the IGMP messages by including a list of permitted sources in the INCLUDE filter. For example, receiver 108 may include both S1 and S2 in a source list with an INCLUDE filter and let router 104-1 enforce the S1 or S2 preference. Alternatively, version v3 may be modified such that the source list also includes a weight of each source. If the weights are equal or empty, then router will not prefer either source. If they are not equal, router 104-1 will prefer the source with the highest weight and if the source with the highest weight is not available, then the preference moves to the source with the second highest weight.

The IGMP join from receiver 108 may be received at the multicast control plane 202 through an interface, designated as INT-1. Multicast control plane 202 creates two entries for S1,G and S2,G in the Multicast routing and forwarding database (MRFD) 204. Once the reverse path forwarding (RPF) neighbors are determined for each entry, multicast tree initiator 203 then sends the PIM join request upstream to the RPF neighbors to join the multicast trees for S1,G and S2,G.

Multicast routing and forwarding database (MRFD) 204 also associates each multicast tree with one or more interfaces in an outgoing interface list (MRFD) when it receives IGMP join on those interfaces. This enables router 104 to send content received for the multicast tree on the specified interface. The interface may be a port or other interface.

The post-ad inserted video content (S2,G) may be associated with the interface INT-1, which is the designated interface that is used to send content to receiver 108. The multicast tree (S1,G) is associated with a non-active interface or a dummy interface. In this case, when content for post-ad inserted content is received, it is sent through the interface INT-1 to receiver 108. However, when content for the pre-ad inserted content is received, it is not sent to receiver 108 because of the non-active interface.

Figure 3:
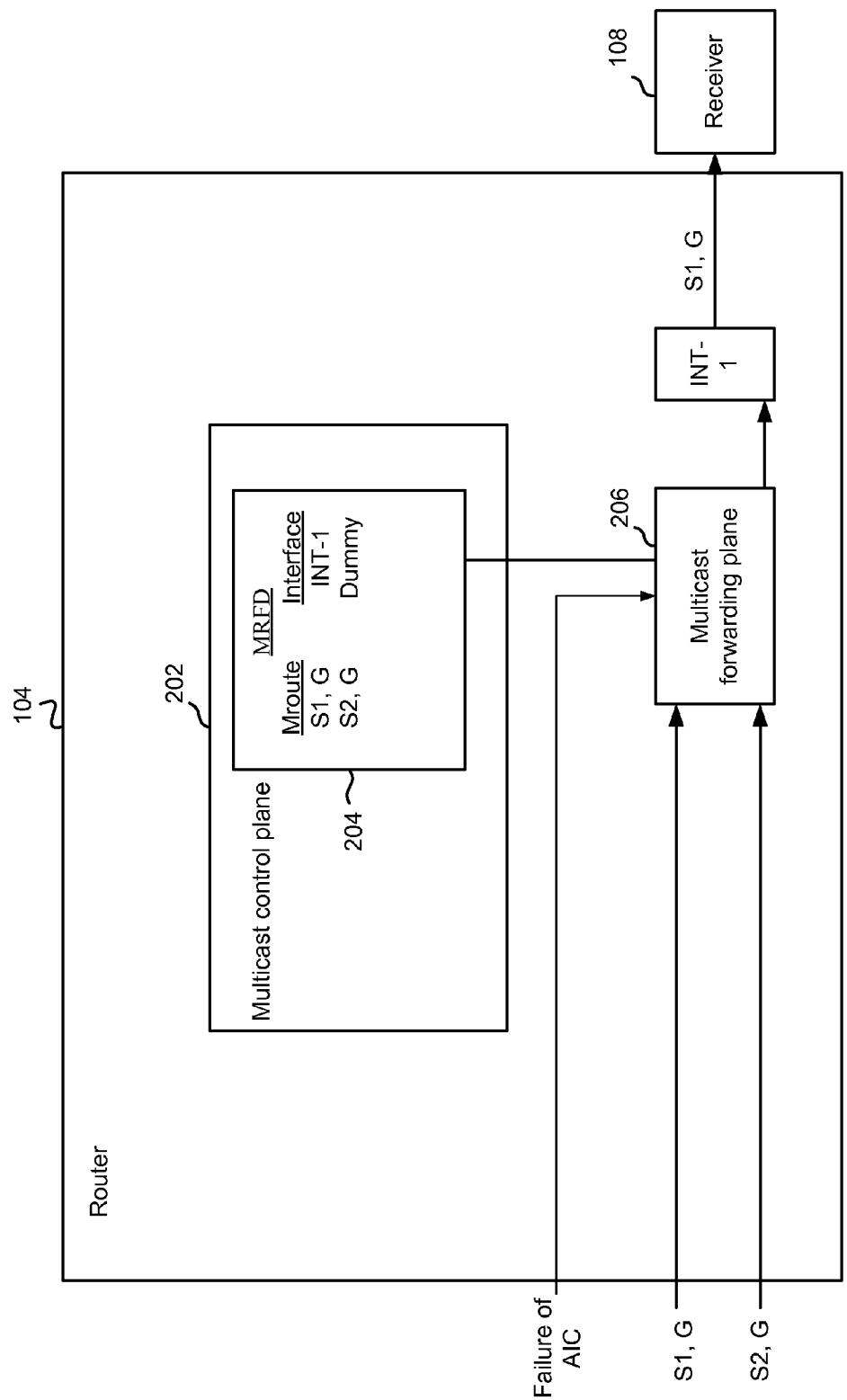
FIG. 3 shows an example where interface INT-1 has been assigned to the multicast tree for source S1 and a non-active or dummy interface has been assigned to the multicast tree for source S2.

The post-ad inserted content may become unavailable due to failures. For example, ad insertion complex 106 may have failed, or the multicast tree for the post-ad inserted content may have failed, or the connection from network 100 to the ad insertion complex may have failed, etc. Referring to FIG. 3, multicast forwarding plane 206 is configured to detect whether the multicast content is no longer available on a specified multicast tree. This includes monitoring of the multicast traffic by packet counts for the specified multicast tree such as (S2,G) for post-ad-inserted content. In this case, a counter may be used that counts packets being received for the specified multicast tree over a time period. If the counter value goes below a certain threshold, then the failure of specified multicast tree may be declared. Other methods of detecting a failure may be appreciated.

Once multicast forwarding plane 206 detects the content failure for the post-ad-inserted multicast, multicast forwarding plane 206 initiates a switch over from one multicast tree to another multicast tree. Although post and pre-ad inserted content is discussed, it will be understood particular embodiments may be applied to switching any two multicast streams for two multicast trees. When the switchover occurs, multicast forwarding plane 206 may swap the outgoing interface list of multicast tree S2,G with the outgoing interface list of multicast tree S1,G in MRFD 204. FIG. 3 shows an example where multicast tree S1,G has been assigned the outgoing interface INT-1 and multicast tree S2,G has been assigned the non-active or dummy interface in MRFD 204. Multicast forwarding plane 206 is then updated to forward the content received on multicast tree for S1,G on INT-1. This causes the pre-ad-inserted content to be sent to receiver 108.

Accordingly, router 104-1 can intelligently deliver the original video content, e.g., the pre-ad inserted content (S1,G) to receiver 108 without any intervention by receiver 108. This may be dynamic and automatic. Also, the switchover may result in minimal outage if any outage at all as the pre-ad inserted content is sent in place of the post-ad inserted content.

When ad insertion complex 106 becomes functional or reachable, it will start to send the post-ad inserted content again. Router 104-1 will then receive the content on the multicast tree (S2,G). Multicast forwarding plane 206 determines when a switchover should occur to the post-ad inserted content. Multicast forwarding plane 206 is configured to detect whether the multicast content is available on a specified multicast tree. This includes monitoring of the multicast traffic by packet counts for the specified multicast tree such as (S2,G) for post-ad-inserted content. In this case, a counter may be used that counts packets being received for the specified multicast tree over a time period. If the counter value goes above a certain threshold, then the availability of specified multicast tree may be declared, and switchover may be performed by multicast forwarding plane 206. In this case, multicast forwarding plane 206 may swap the outgoing interface list of multicast tree S1,G with the outgoing interface list of multicast tree S2,G in the MRFD 204. FIG. 2 shows an example in which multicast tree S1,G is now assigned the non-active or dummy interface and multicast tree S2,G is assigned the outgoing interface INT-1 and in MRFD 204. Multicast forwarding plane 206 is then updated to forward the content received on multicast tree for S2,G on INT-1. Receiver 108 then receives the post-ad inserted content from multicast tree for S2,G as is shown in FIG. 2.

Figure 4:
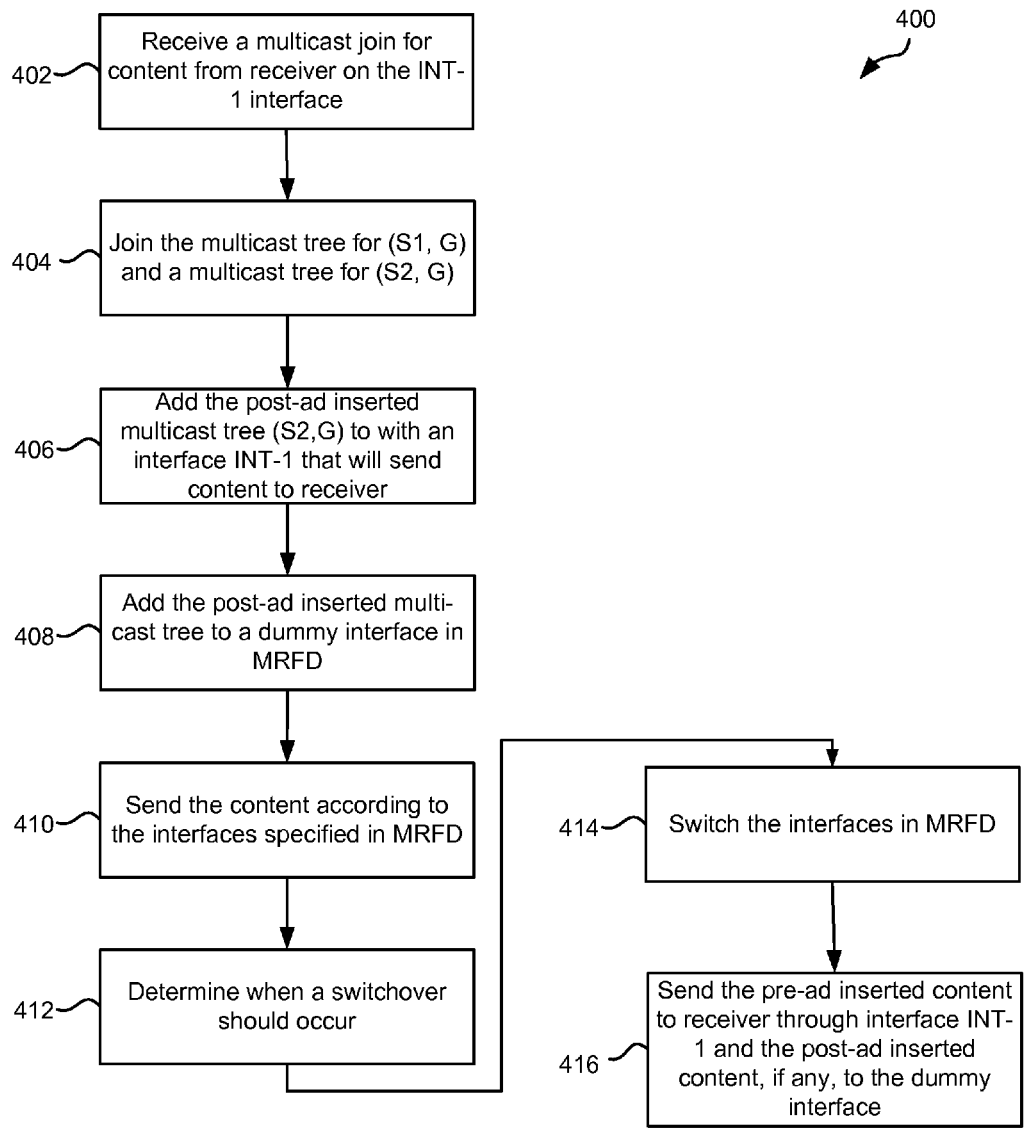
FIG. 4 depicts a flowchart for a method for delivering content according to one embodiment.

FIG. 4 depicts a flowchart for a method for delivering content according to one embodiment. Step 402 receives a multicast join for content from receiver 108 on the INT-1 interface. Receiver 108 may send joins for one or more sources of content that may be pre-ad inserted content and post-ad inserted content.

Step 404 joins the multicast tree for (S1, G) and a multicast tree for (S2, G) if router 104-1 has not already joined them. For example, a join for (*,G) may be sent to join routes for S1 and S2. The multicast trees may be different for the pre-ad inserted content and the post-ad inserted content. For example, the multicast trees may traverse different routers in the network. Specifically, the pre-ad inserted content does not traverse ad insertion complex 106.

Step 406 adds the post-ad inserted multicast tree (S2,G) to MRFD 204 with an interface INT-1 that will send content to receiver 108. Step 408 adds the pre-ad inserted multicast tree to a dummy interface in MRFD 204.

Step 408 receives content for the post-ad inserted multicast tree and pre-ad inserted multicast tree. Step 410 then sends the content according to the interfaces specified in MRFD 204. For example, the post-ad inserted content is sent to receiver 108 through interface INT-1. Also, the pre-ad inserted content is sent through a dummy interface, which does not send the content to receiver 108.

Step 412 determines when a switchover should occur. For example, the numbers of packets received for the post-ad inserted content may fall below a certain level. When a switchover should occur, step 414 switches the interfaces in MRFD 204. For example, the post-ad inserted content multicast tree is switched to the dummy interface and the pre-ad inserted multicast tree is switched to interface INT-1.

Step 416 then sends the pre-ad inserted content to receiver 108 through interface INT-1 and the post-ad inserted content, if any, to the dummy interface. The process then reiterates to determine if another switchover should occur. This process may continue as switchovers between the pre-ad inserted content and the post-ad inserted content are performed as failures are detected.

Particular embodiments provide many advantages. For example, a network protects against ad insertion complex failure with minimized outages. This process can also be applied to enable a router to switch from a primary to a secondary multicast tree if the router fails to receive the content using the primary multicast tree. This provides an intelligent solution that can be applied by a router instead of a receiver, and does not require any interaction by a receiver to cause the switchover. Thus, no changes to receiver 108 need to be made to perform the switchover. Receiver 108 continues to receive the content as per the request.

Although the description has been described with respect to particular embodiments thereof, these particular embodiments are merely illustrative, and not restrictive. Particular embodiments may be applicable to any two multicast routes with primary and secondary relationship.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
joining a first multicast tree for a first content generated at a first source, wherein the first multicast tree is identified at least by the first source;
joining a second multicast tree for a second content generated at a second source, wherein the second multicast tree is different from the first multicast tree, wherein the second multicast tree is identified at least by the second source, wherein the first source is different from the second source, and the first content includes advertising content overlaid on the second content;
adding a first outgoing interface to the first multicast tree to allow the first content to be sent to a receiver when the first content is received;
adding a second outgoing interface to the second multicast tree, wherein the second outgoing interface is non-active, such that the second content is not sent to the receiver when the second content is received;
determining a failure of receiving the first content on the first multicast tree;
switching from the first outgoing interface to the second outgoing interface such that the second content is sent to the receiver;
determining a resolution of the failure such that the first content is received on the first multicast tree; and
switching from the second outgoing interface to the first outgoing interface such that the first content is sent to the receiver.

2. The method of claim 1, further comprising:
sending one or more join messages for first and second multicast trees.

3. The method of claim 1, further comprising:
receiving a join request from the receiver specifying the first source and the second source;
determining the first and second sources using a source priority specified in the join request;
joining the first multicast tree for the first source and the second multicast tree for the second source; and
sending the content from the first multicast tree to the receiver until the failure of receiving the first content on the first multicast tree.

4. The method of claim 3, further comprising:
receiving a join request from the receiver for a multicast group without specifying source;
determining the first and second sources for the specified multicast group based on a predetermined configuration;
joining the first multicast tree for the first source and the second multicast tree for the second source; and
sending the content from the first multicast tree to the receiver until the failure of receiving the first content on the first multicast tree.

5. The method of claim 1, further comprising:
monitoring traffic for the first multicast tree;
determining if the failure occurs based on the traffic; and
performing the switching to the second outgoing interface upon the determination.

6. The method of claim 5, further comprising:
monitoring traffic for the first multicast tree;
determining if traffic received for the first multicast tree indicates the resolution in the failure; and
performing the switching to the first outgoing interface upon the determination of the resolution.

7. The method of claim 1, wherein the multicast tree is identified by either an IP route or MPLS label.

8. The method of claim 1, wherein the switching is performed without notification from the receiver to switch the multicast trees.

9. The method of claim 1, wherein the first multicast tree includes an ad that is inserted by an insertion complex that is part of the first multicast tree.

10. An apparatus comprising:
one or more processors; and
logic encoded in one or more tangible non-transitory media for execution by the one or more processors and when executed operable to:
join a first multicast tree for a first content generated at a first source, wherein the first multicast tree is identified at least by the first source;
join a second multicast tree for a second content generated at a second source, wherein the second multicast tree is different from the first multicast tree, wherein the second multicast tree is identified at least by the second source, wherein the first source is different from the second source, and the first content includes advertising content overlaid on the second content;
add a first outgoing interface to the first multicast tree to allow the first content to be sent to a receiver when the first content is received;
add a second outgoing interface to the second multicast tree, wherein the second outgoing interface is non-active, such that the second content is not sent to the receiver when the second content is received;
determine a failure of receiving the first content on the first multicast tree; and
switch from the first outgoing interface to the second outgoing interface such that the second content is sent to the receiver;
determine a resolution of the failure such that first content is received on the first multicast tree; and
switch from the second outgoing interface to the first outgoing interface such that the first content is sent to the receiver.

11. The apparatus of claim 10, wherein the logic when executed is further operable to send one or more join messages for first and second multicast trees.

12. The apparatus of claim 10, wherein the logic is further operable to:
receive a join request from the receiver specifying first source and the second source;
determine the first and second sources using a source priority specified in the join request;
join the first multicast tree for the first source and the second multicast tree for the second source; and
send the first content from the first multicast tree to the receiver until the failure of receiving the first content on the first multicast tree.

13. The apparatus of claim 10, wherein the logic when executed is further operable to:
monitor traffic for the first multicast tree;
determine if the failure occurs based on the traffic; and
perform the switching to the second outgoing interface upon the determination.

14. The apparatus of claim 13, wherein the logic when executed is further operable to:
monitor traffic for the first multicast tree;
determine if traffic received for the first multicast tree indicates the resolution in the failure; and
perform the switching to the first outgoing interface upon the determination of the resolution.

15. The apparatus of claim 10, wherein the multicast tree is identified by either an IP route or MPLS label.

16. The apparatus of claim 10, wherein the switching is performed without notification from the receiver to switching the multicast trees.

17. The apparatus of claim 10, wherein the first multicast tree includes an ad that is inserted by an insertion complex that is part of the first multicast tree.

18. An apparatus comprising:
- means for joining a first multicast tree for a first content generated at a first source, wherein the first multicast tree is identified at least by the first source;
- means for joining a second multicast tree for a second content generated at a second source, wherein the second multicast tree is different from the first multicast tree, wherein the second multicast tree is identified at least by the second source, wherein the first source is different from the second source, and the first content includes advertising content overlaid on the second content;
- means for adding a first outgoing interface to the first multicast tree to allow the first content to be sent to a receiver when the first content is received;
- means for adding to a second outgoing interface to the second multicast tree, wherein the second outgoing interface is non-active such that the second content is not sent to the receiver when the second content is received;
- means for determining a failure of receiving the first content on the first multicast route;
- means for switching from the first outgoing interface to the second outgoing interface such that the second content is sent to the receiver;
- means for determining a resolution of the failure such that first content is received on the first multicast tree; and
- means for switching to the first outgoing interface such that the first content is sent to the receiver.

* * * * *